(12) United States Patent
Kuboyama

(10) Patent No.: US 8,041,576 B2
(45) Date of Patent: Oct. 18, 2011

(54) INFORMATION PROCESSING APPARATUS AND INFORMATION PROCESSING METHOD

(75) Inventor: Hideo Kuboyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1015 days.

(21) Appl. No.: 11/936,025

(22) Filed: Nov. 6, 2007

(65) Prior Publication Data

US 2008/0140423 A1    Jun. 12, 2008

(30) Foreign Application Priority Data

Dec. 8, 2006 (JP) ................................. 2006-332174

(51) Int. Cl.
    *G10L 15/00* (2006.01)
(52) U.S. Cl. ................. 704/275; 704/251; 704/270
(58) Field of Classification Search ............. 704/251, 704/270, 275; 369/65.01
See application file for complete search history.

(56) References Cited

U.S. PATENT DOCUMENTS

| 2005/0027538 | A1* | 2/2005 | Halonen et al. | 704/275 |
| 2008/0120112 | A1* | 5/2008 | Jordan et al. | 704/270 |
| 2009/0228269 | A1* | 9/2009 | Monne et al. | 704/231 |

FOREIGN PATENT DOCUMENTS

JP    10-171492 A    6/1998

* cited by examiner

*Primary Examiner* — Daniel D Abebe
(74) *Attorney, Agent, or Firm* — Canon U.S.A., Inc. IP Division

(57) ABSTRACT

An information processing apparatus performs a process in accordance with a command. The information processing apparatus includes a first selection unit configured to refer to a storage unit that stores a plurality of recognition commands for inputting the command by speech, recognize input speech and select a command based on the recognized input speech, and a second selection unit configured to sequentially select a plurality of commands that correspond to a plurality of recognition commands stored in the storage unit. The information processing apparatus further includes a process determination unit configured to select either the first selection unit or the second selection unit based on an operation performed on a predetermined operation unit, and an execution unit configured to execute a command which is selected by one of the selection units that is selected by the process determination unit.

4 Claims, 12 Drawing Sheets

FIG. 11

| RECOGNITION COMMAND | PHONEME SEQUENCE |
|---|---|
| 48 | yoXjuuhachi |
| 152 | hyakugojuuni |
| 155 | hyakugojuugo |
| 593 | gohyakukyuujuusaX |
| 716 | nanahyakujuuroku |

INFORMATION PROCESSING APPARATUS AND INFORMATION PROCESSING METHOD

BACKGROUND OF THE INVENTION

1. Field of the Invention

The present invention relates to an information processing apparatus (e.g., television set, computer, etc.) which is capable of performing speech recognition.

2. Description of the Related Art

Speech recognition technology for recognizing speech of a user can be used in various devices such as car navigation. Speech recognition allows a user to enter an input selected from a plurality of selection items by speaking a corresponding word only once. As a result, the number of user operable buttons or other user input steps required for operating a device can be reduced. However, speech recognition has problems such as misrecognition, or that a device using speech recognition cannot be operated when a user does not remember the recognition vocabulary.

To solve such problems, speech recognition is often used together with operation performed on a graphical user interface (GUI) using buttons and screen, thus realizing user-friendliness in a device operation. An example of such a method is discussed in Japanese Patent Application Laid-Open No. 10-171492. Further, for example, a method is devised in which a user is presented with a list of speech recognition commands, and the user can select a recognition command from the list through a GUI. FIG. 12 illustrates a speech recognition apparatus displaying a list of recognition commands.

In FIG. 12, a list 1201 is a list of speech recognition commands. A focus 1202 selects an item from the list 1201. When a user presses a predetermined button in the speech recognition apparatus, the speech recognition apparatus displays the list 1201 illustrated in FIG. 12. The user moves the focus 1202 by, for example, pressing a button, and the user can select the desired recognition command and execute the command.

However, in a case where a user wants to consecutively execute a plurality of commands, it may not be appropriate either to select recognition commands by using speech recognition, or to select recognition commands from a list as described above. For example, when a user selects a moving image, still image, or music, from a plurality of contents, it is preferable to sequentially select and confirm each of the contents before selecting the desired content. In such a case, it is burdensome for a user to pronounce each of contents. On the other hand, in a case where a user selects an item from among a list, many operations are required, such as displaying the list, moving the focus, and executing the recognition command. Consequently, it is difficult to consecutively execute a plurality of recognition commands.

Therefore, it is desirable that an information processing apparatus includes a method which allows a user to sequentially select recognition commands by a single operation. In such a method, recognition commands can be consecutively selected and confirmed by a single operation, which complements selection of a desired recognition command by speech recognition. Furthermore, it is desirable to relate the sequential selection of recognition commands and the speech recognition operation to each other, so that a user can intuitively understand the relation between the two operations. This can be realized by, for example, performing the two operations using the same button.

SUMMARY OF THE INVENTION

According to an aspect of the present invention, an embodiment is directed to an information processing apparatus which performs a process in accordance with a command. The information processing apparatus includes a first selection unit configured to refer to a storage unit that stores a plurality of recognition commands for inputting the command by speech, recognize input speech, and select a command based on the recognized input speech, a second selection unit configured to sequentially select a plurality of commands that correspond to a plurality of recognition commands stored in the storage unit, a process determination unit configured to select either the first selection unit or the second selection unit based on an operation (e.g., user input operation) performed on a predetermined operation unit (e.g., a button included in a remote controller), and an execution unit configured to execute a command which is selected by one of the selection units that is selected by the process determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 illustrates phoneme sequences of recognition commands according to a tenth exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
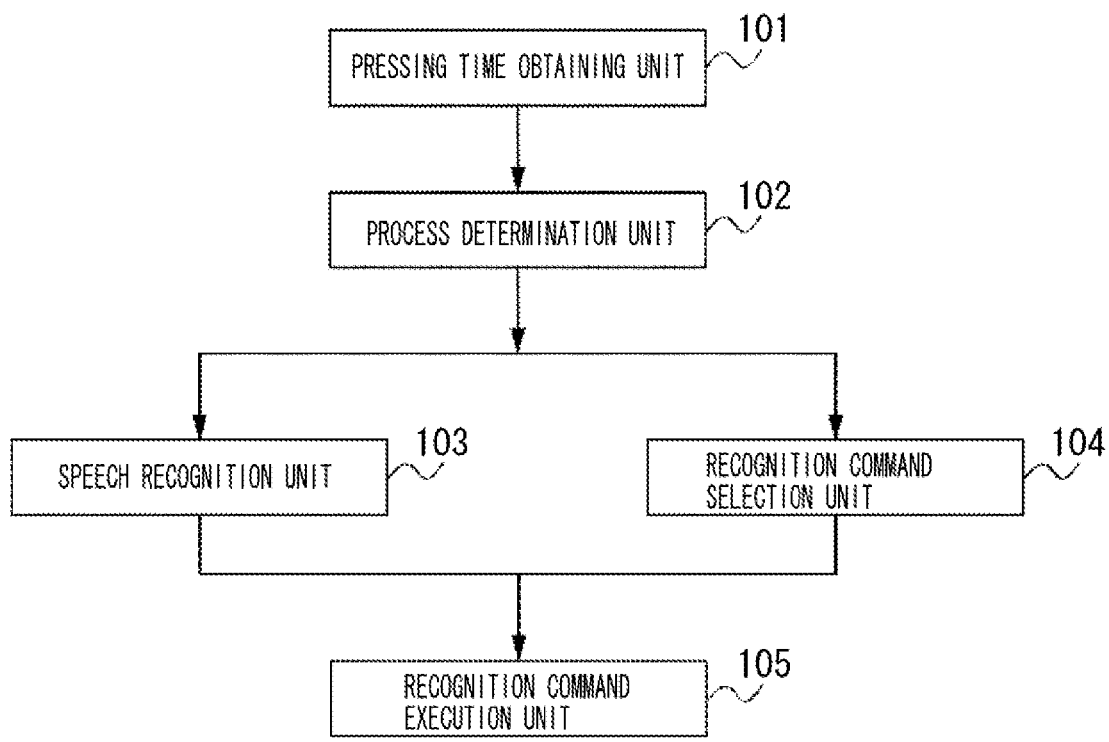
FIG. 1 illustrates a block diagram illustrating a functional configuration of an information processing apparatus according to a first exemplary embodiment of the present invention.

FIG. 1 illustrates a block diagram illustrating a functional configuration of an information processing apparatus according to a first exemplary embodiment of the present invention.

Referring to FIG. 1, a pressing time obtaining unit 101 obtains a pressing time representing a length of time a speech recognition button assigned to speech recognition is pressed. A process determination unit 102 determines a recognition command selection process based on a pressing time of the speech recognition button. A speech recognition unit 103 recognizes speech spoken by a user and selects a recognition command that is a speech recognition target. A recognition command selection unit 104 selects a recognition command in a predetermined order. A recognition command execution unit 105 executes the selected recognition command.

Figure 2:
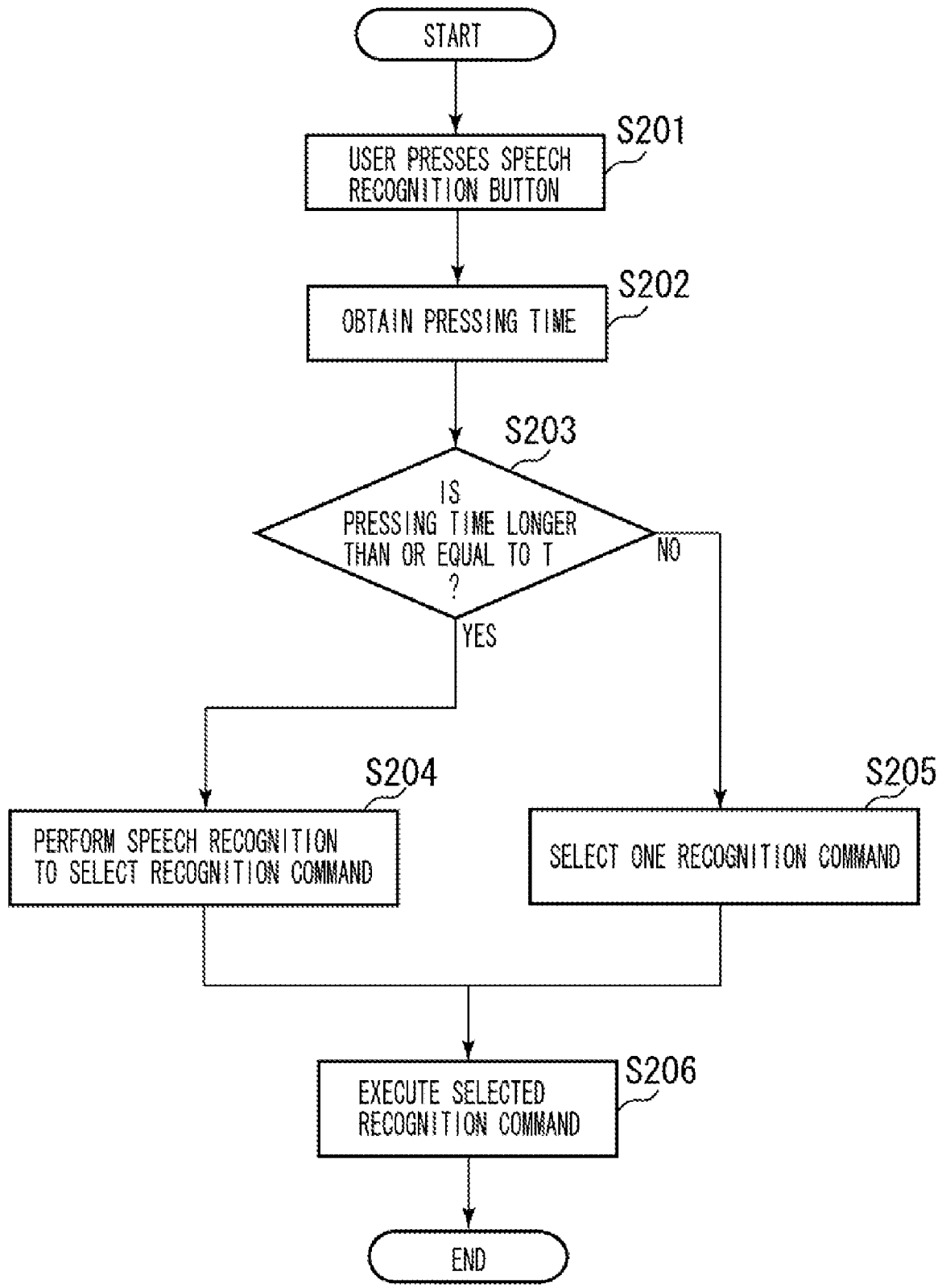
FIG. 2 is a flowchart illustrating a process of the information processing apparatus according to the first exemplary embodiment of the present invention.

FIG. 2 is a flowchart illustrating a process of the information processing apparatus according to the first exemplary embodiment of the present invention. Operation of an embodiment of the present invention will be described below by referring to FIGS. 1 and 2.

In step S201, a user presses a speech recognition button for performing speech recognition. In step S202, the pressing time obtaining unit 101 obtains a pressing time of the speech recognition button. In step S203, the process determination unit 102 determines whether the pressing time is longer than or equal to a predetermined length of time T. If the pressing time is longer than or equal to T (YES in step S203), the process determination unit 102 selects the speech recognition unit 103. Then, the process proceeds to step S204 in which the speech recognition unit 103 selects a recognition command by recognizing a user's speech. On the other hand, if the pressing time is shorter than T (NO in step S203), the process determination unit 102 selects the recognition command selection unit 104. Then, the process proceeds to step S205 in which the recognition command selection unit 104 selects in a predetermined order a recognition command from recognition commands that are recognition targets. In step S206, the recognition command execution unit 105 executes the recognition command which is selected by the speech recognition unit 103 or the recognition command selection unit 104.

Figure 3:
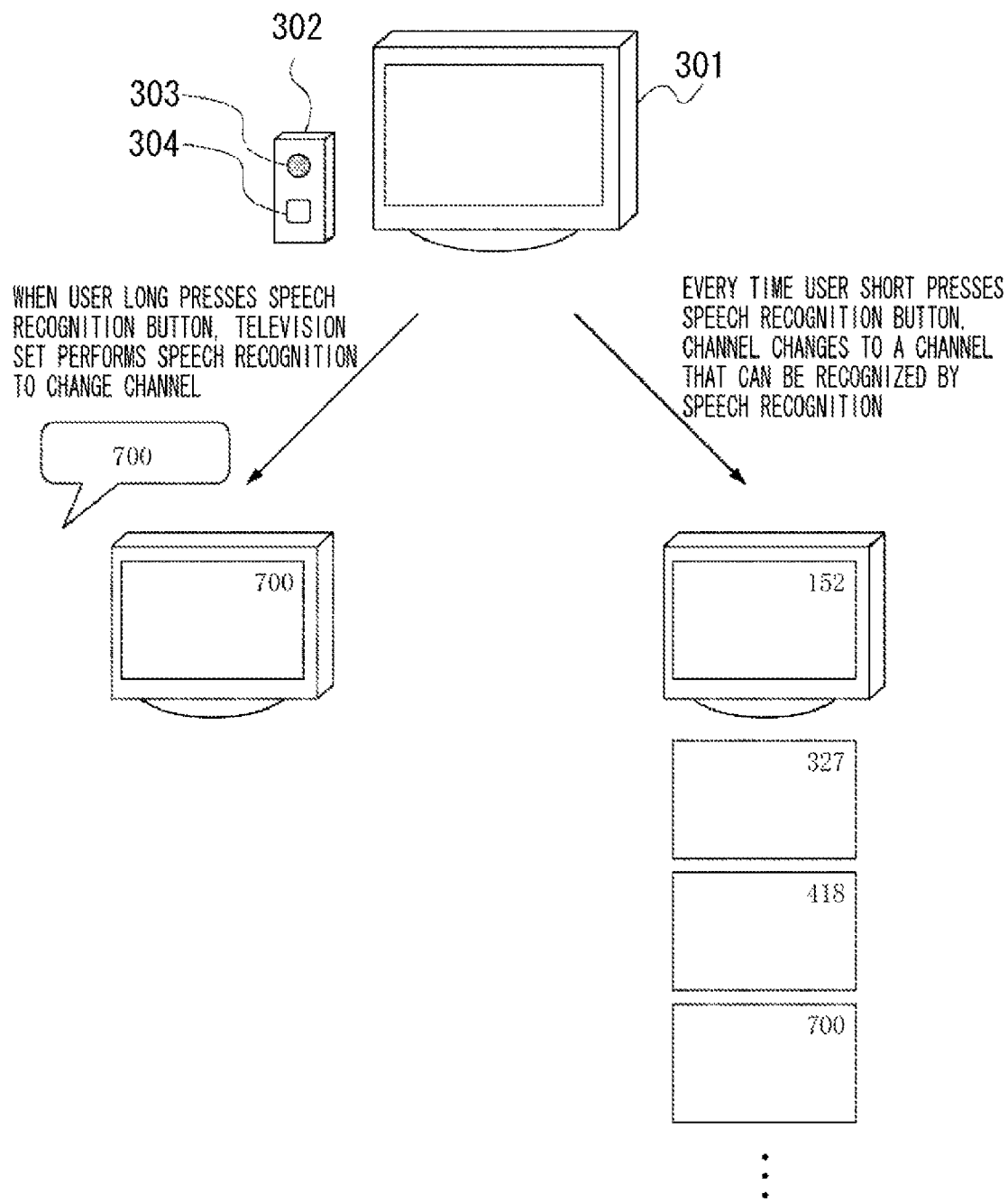
FIG. 3 illustrates an operation of the information processing apparatus according to the first exemplary embodiment of the present invention.

FIG. 3 illustrates an example of an information processing apparatus according to the first exemplary embodiment of the present invention. A system configured of a television set is described as an example. The television system includes a remote controller having a microphone and a speech recognition button, the pressing time obtaining unit 101, process determining unit 102, speech recognition unit 103, recognition command selection unit 104, and recognition command execution unit 105. Referring to FIG. 3, a television set 301 is operated by a remote controller 302. In the remote controller 302, a microphone 303 is used to input speech, and a speech recognition button 304 is a button associated with speech recognition.

In FIG. 3, when a user presses the speech recognition button 304 for a long duration (referred to herein as "long press" or "long pressing"), the television set 301 detects the long pressing and performs speech recognition. More specifically, when the user long presses the speech recognition button 304, and speaks into the microphone 303, this causes the remote controller 302 to send speech data to the television set 301. The television set 301 recognizes the speech data and then executes the recognition command which is a recognition result. For example, when a user speaks "700" into the microphone 303 of the remote controller 302, the television set 301 processes the corresponding speech data received from the remote controller 302 and recognizes the speech, and causes the display channel to be changed to channel 700 in accordance with the recognized speech.

On the other hand, if a user presses the speech recognition button 304 for a short duration (referred to herein as "short press" or "short pressing"), the television set 301 detects the short pressing. Each time the television set 301 detects such a short pressing, the television set 301 executes in a predetermined order a recognition command that can be recognized by speech recognition. Referring to the example of FIG. 3, each time the user short presses the speech recognition button 304, the television set 301 consecutively changes and switches to a channel which is a recognition target, such as 152, 327, and 418. The recognition commands can be executed in any order, for example, in a numerical order, in an alphabetical order, or in an order of registering as a speech recognition target.

Figure 4:
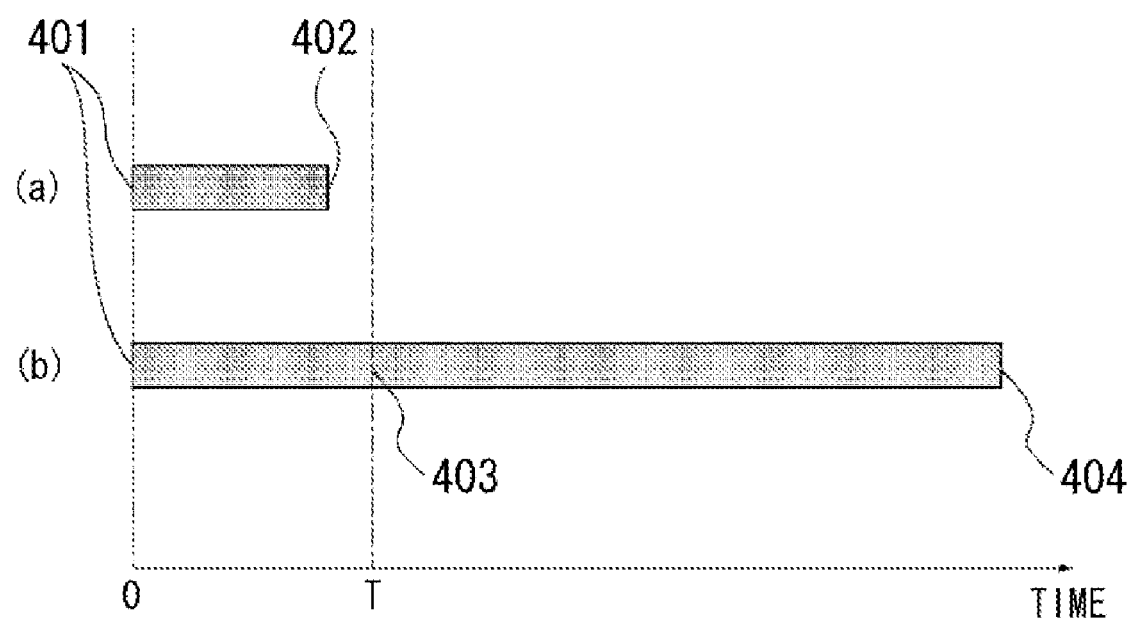
FIG. 4 is a graph of button pressing time according to the first exemplary embodiment of the present invention.

FIG. 4 is a graph of pressing time of a speech recognition button 304 according to the present exemplary embodiment. The horizontal axis represents the button pressing time, and at time 0, a user starts to press the speech recognition button. Graph (a) represents a pressing time of a short pressing and graph (b) represents a pressing time of a long pressing of the speech recognition button 304.

In a case of graph (a) which represents a short pressing time, a period between time 401 when an information processing apparatus detects that a user presses the speech recognition button 304 and time 402 when a user releases the speech recognition button 304, is shorter than the threshold value T. Therefore, at time 402, the process determination unit 102 selects the recognition command selection unit 104, and the recognition command selection unit 104 selects a recognition command based on a predetermined order. The recognition command execution unit 105 then executes the recognition command.

In a case of graph (b) which represents a long pressing time, the process determination unit 102 selects the speech recognition unit 103 at time 403. At time 403, time T has elapsed from time 401 when the information processing apparatus detects pressing of the speech recognition button 304. The speech recognition unit 103 obtains the user's speech and performs speech recognition during a period between time 403 and time 404 when the user releases the speech recognition button 304. The recognition command execution unit 105 then executes the recognition command which is the result of the speech recognition.

As described above, in the present exemplary embodiment, when a user long presses a speech recognition button 304, speech recognition is performed and a desired recognition command is executed. Furthermore, the present exemplary embodiment provides an operation in which recognition commands are consecutively executed when a user short presses a speech recognition button 304, which complements the process performed using speech recognition.

Second Exemplary Embodiment

The first exemplary embodiment describes an example in which the present invention is applied to an operation of a television set as illustrated in FIG. 3. In FIG. 3, the remote controller 302 which includes the microphone 303 and the speech recognition button 304 is an apparatus separated from the television set 301. Consequently, the button pressing time obtaining unit 101 that is included in the television set 301 obtains the pressing time based on a control signal received from the remote controller 302.

However, the present invention is not limited to the above exemplary embodiment. An information processing apparatus can include a microphone, a speech recognition button, a pressing time obtaining unit, a processing determining unit, a speech recognition unit, a recognition command selection unit, and a recognition command execution unit. In this case, the pressing time obtaining unit obtains the pressing time based on the pressing state of the speech recognition button which is included in the same information processing apparatus.

Moreover, a first information processing apparatus can include a microphone, a speech recognition button, a pressing time obtaining unit, and a process determination unit. A second information processing apparatus can include a speech recognition unit, a recognition command selection unit, and a recognition command execution unit. In this case, the determination result obtained by the process determination unit in the first information processing apparatus is sent to the second information processing apparatus. Other various configurations can also be realized.

Third Exemplary Embodiment

Figure 5:
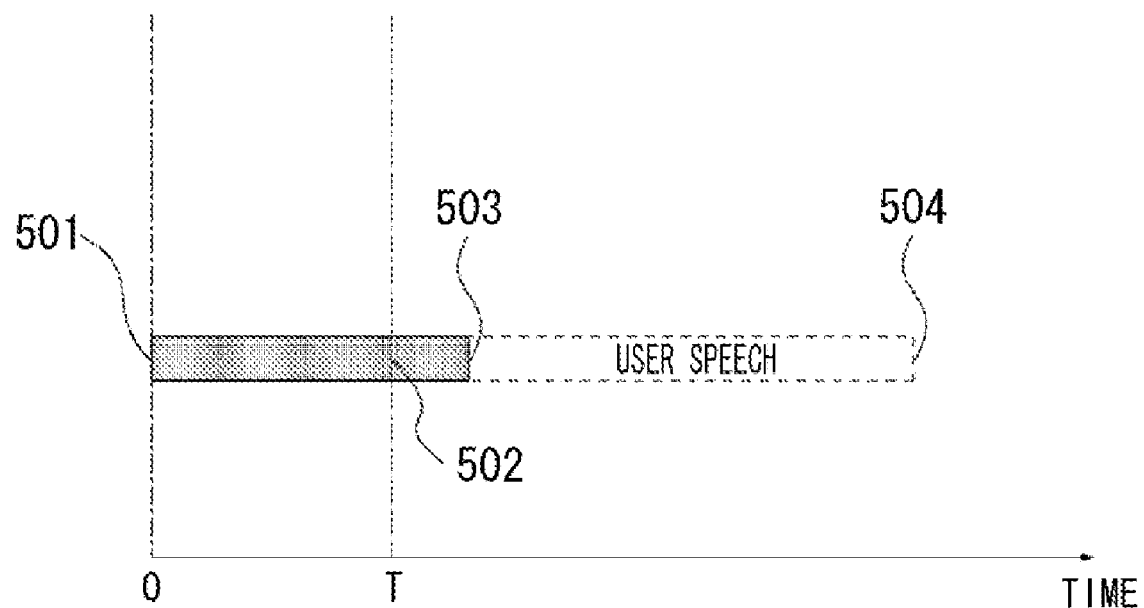
FIG. 5 is a graph of button pressing time according to a third exemplary embodiment of the present invention.

In the above-described exemplary embodiments as shown in FIG. 4, when a user long presses the speech recognition button, the information processing apparatus obtains user's speech and performs speech recognition on the obtained speech during the pressing of the button. However, the present invention is not limited to the above exemplary embodiment, and a user's speech can be obtained and the speech recognition can be performed also after the user stops long pressing of the speech recognition button. FIG. 5 illustrates such an exemplary embodiment.

Referring to FIG. 5, the process determination unit 102 selects the speech recognition unit 103 at time 502. At time 502, time T has elapsed from time 501 when a user starts pressing the speech recognition button. The speech recognition unit 103 starts to obtain the user's speech at time 502, or at time 503 when the user releases the speech recognition button. In the obtaining of speech, a voice activity detection technology is used to detect whether user's speech is present. The speech obtaining ends at time 504 when the user's speech is not present. Various methods of the voice activity detection technology are discussed in the field of speech recognition, such as detection based on power of speech, and any detection method can be used. The speech recognition unit 103 selects a recognition command by performing speech recognition on the obtained speech. The recognition command execution unit 105 then executes the recognition command obtained by the speech recognition.

Fourth Exemplary Embodiment

In the above-described exemplary embodiments, the process determination unit 102 selects the speech recognition unit 103 when a user presses a speech recognition button longer than or equal to the length of time T. On the other hand, the process determination unit 102 selects the recognition command selection unit 104 when the pressing time of the speech recognition button is shorter than T. However, the present invention is not limited to the above exemplary embodiment. The process determination unit 102 can select the speech recognition unit 103 when the pressing time of the speech recognition button is shorter than T, and select the recognition command selection unit 104 when the pressing time is longer than or equal to T. Such an exemplary embodiment will be described below.

Figure 6:
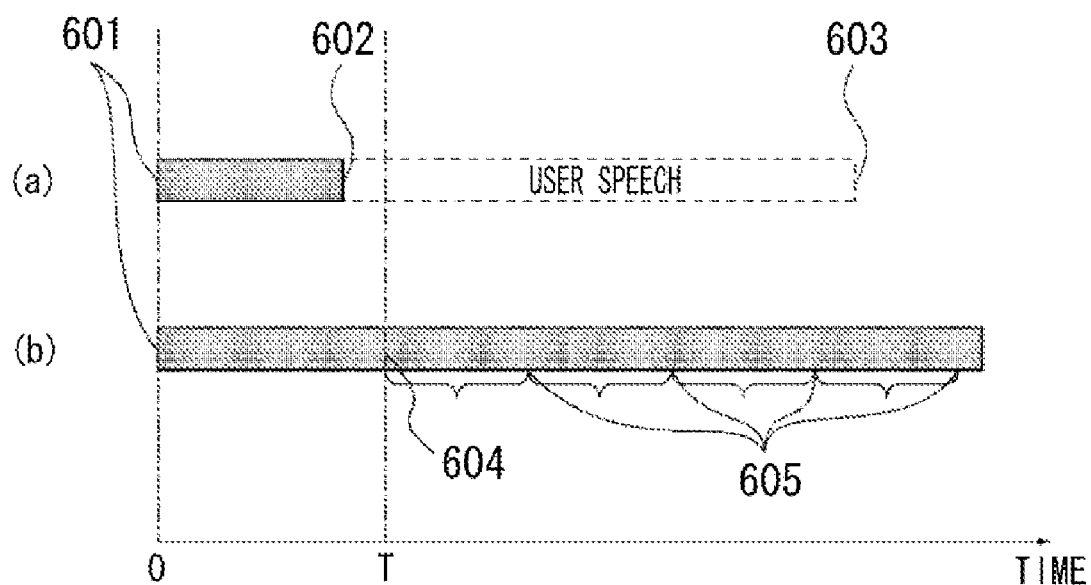
FIG. 6 is a graph of button pressing time according to a fourth exemplary embodiment of the present invention.

FIG. 6 is a graph of pressing time of a speech recognition button according to the present exemplary embodiment. In FIG. 6, graph (a) represents time of a short pressing of the speech recognition button, and graph (b) represents time of a long pressing of the speech recognition button.

In graph (a) which represents a short pressing time, a period between time 601 when the user presses the speech recognition button and time 602 when the button is released is shorter than T. Therefore, the process determination unit 102 selects the speech recognition unit 103. The speech recognition unit 103 starts obtaining speech at time 602 and detects whether a user's speech is present using voice activity detection technology. Various methods of the voice activity detection technology are discussed in the field of speech recognition, such as detection based on power of speech, and any detection method can be used. When the speech recognition unit 103 detects that the user speech is not present at time 603, the speech recognition unit 103 stops obtaining speech, performs speech recognition, and selects a recognition command.

In graph (b) which represents a long pressing time, the process determination unit 102 selects the recognition command selection unit 104 at time 604. At time 604, time T has elapsed from when the user presses the speech recognition button. The recognition command selection unit 104 then selects a recognition command in a predetermined order, and the recognition command execution unit 105 executes the recognition command. While the user long presses the speech recognition button, the recognition command selection unit 104 consecutively selects a recognition command in a predetermined order at a predetermined time interval 605. The recognition command execution unit 105 executes the recognition command.

According to the present exemplary embodiment, in a case where a user short presses the speech recognition button, the user speaks after pressing the button, and the information processing apparatus executes a recognition command obtained as a result of the speech recognition. When the user long presses the speech recognition button, the information processing apparatus consecutively executes the recognition command at a predetermined time interval during the pressing of the button.

Fifth Exemplary Embodiment

According to the above-described exemplary embodiments, in FIGS. 4, 5, and 6 it is described that an information processing apparatus starts obtaining speech when the process determination unit 102 selects the speech recognition unit 103 (i.e., at time 403 in FIG. 4, time 502 or time 503 in FIG. 5, and time 602 in FIG. 6).

However, the present invention is not limited to the above-described exemplary embodiments, and the information processing apparatus can start obtaining speech also when a user starts pressing the speech recognition button (i.e., at time 401 in FIG. 4, time 501 in FIG. 5, and time 601 in FIG. 6). In such a case, the information processing apparatus stores the obtained speech in a memory. If the process determination unit 102 selects the speech recognition unit 103 (i.e., at time 403 in FIG. 4, time 502 or time 503 in FIG. 5, and time 602 in FIG. 6), the information processing apparatus performs speech recognition on the obtained speech. On the other hand, if the process determination unit 102 selects the recognition command selection unit 104 (at time 402 in FIG. 4 and time 604 in FIG. 6), the information processing apparatus deletes the speech stored in the memory at that time.

Alternatively, when a user starts pressing the speech recognition button (i.e., at time 401 in FIG. 4, time 501 in FIG. 5, and time 601 in FIG. 6), the information processing apparatus can start performing speech recognition at the same time as obtaining speech. In such a case, if the process determination unit 102 selects the recognition command selection unit 104 (at time 402 in FIG. 4 and time 604 in FIG. 6), the information processing apparatus deletes the speech stored in the memory and ends speech recognition.

Figure 7:
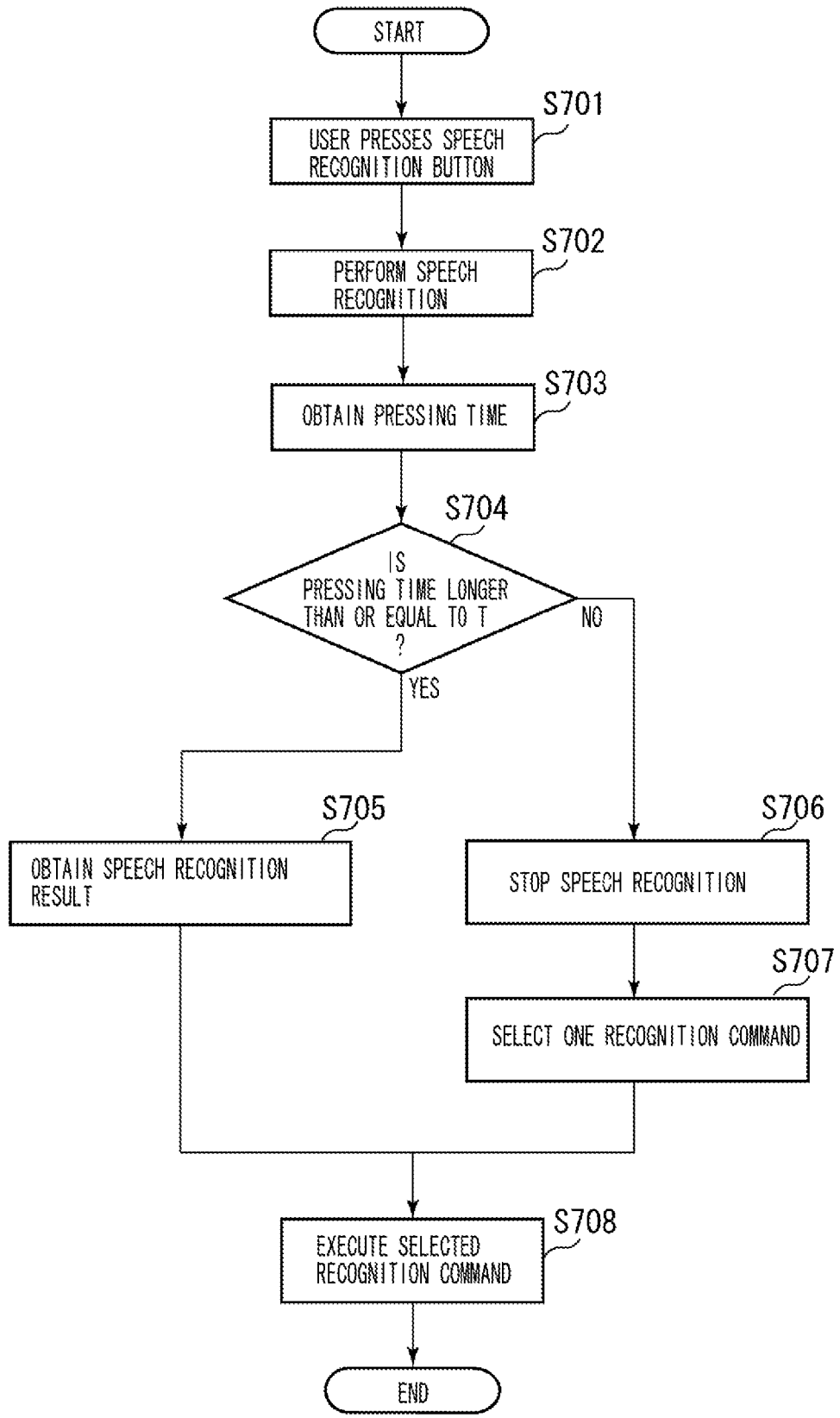
FIG. 7 is a flowchart illustrating a process of the information processing apparatus according to a fifth exemplary embodiment of the present invention.

FIG. 7 is a flowchart illustrating the above-described case. In step S701, a user presses the speech recognition button to perform speech recognition. In step S702, the speech recognition unit 103 starts obtaining speech and starts performing speech recognition. In step S703, the pressing time obtaining unit 101 obtains a pressing time of the speech recognition button.

Then, in step S704, the process determination unit 102 determines whether the pressing time is longer than or equal to a predetermined length of time T. If the pressing time is longer than or equal to T (YES in step S704), the process determination unit 102 selects the speech recognition unit 103. The conditions of "longer than or equal to" and "shorter than" can be switched in accordance with the above-described exemplary embodiments. Then the process advances to step S705 in which the speech recognition unit 103 selects a recognition command from a result of speech recognition. On the other hand, if the pressing time is shorter than T (NO in step S704), the process determination unit 102 selects the recognition command selection unit 104. Then the process proceeds to step S706 in which the process determination unit 102 ends the speech recognition performed by the speech recognition unit 103. In step S707, the recognition command selection unit 104 selects in a predetermined order a recognition command from among the recognition commands. In step S708, the recognition command execution unit 105 executes a recognition command which is selected by the speech recognition unit 103 or the recognition command selection unit 104.

Sixth Exemplary Embodiment

Figure 8:
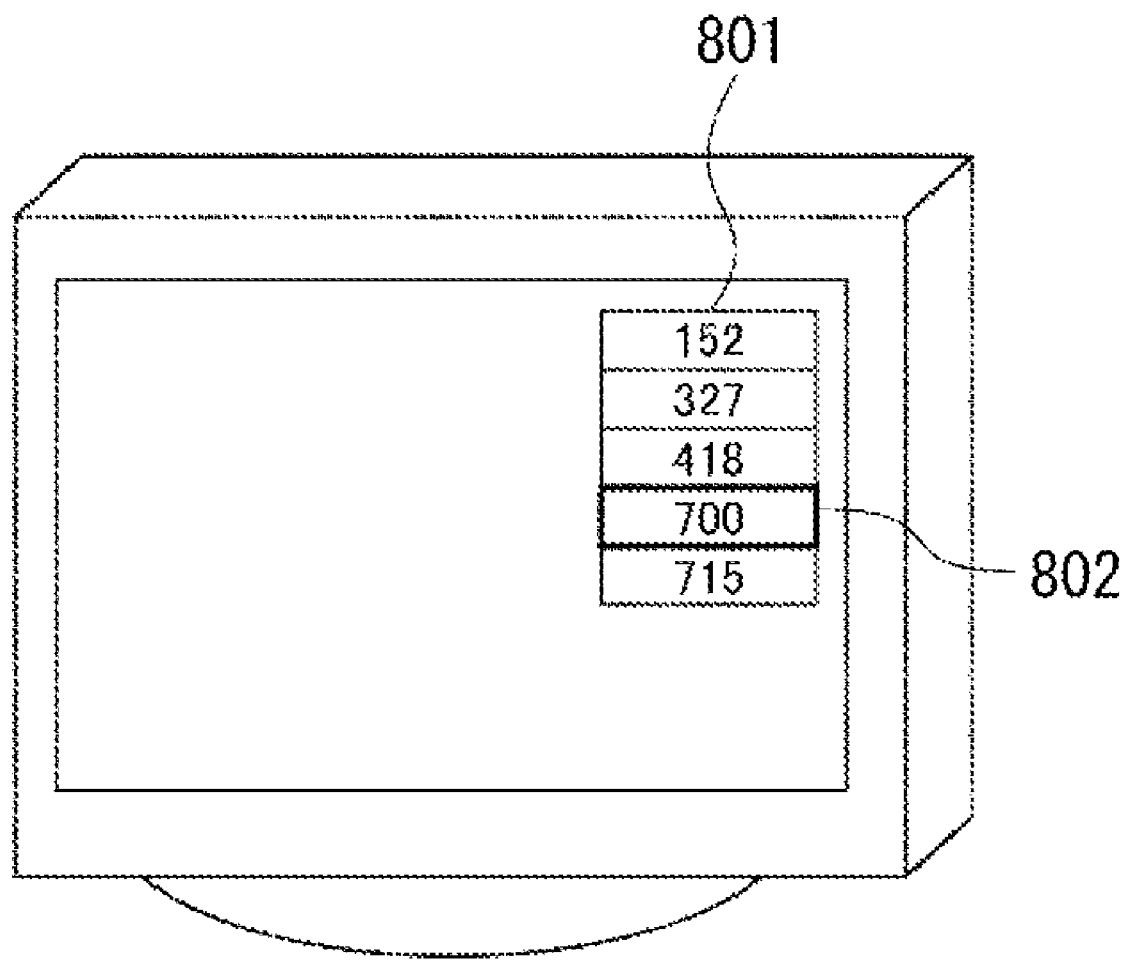
FIG. 8 illustrates a list of recognition commands which is displayed when commands are sequentially selected and executed according to a sixth exemplary embodiment of the present invention.

In the first exemplary embodiment, as illustrated in FIG. 3, when a user short presses the speech recognition button, the recognition command selection unit 104 consecutively selects recognition commands. Consequently, the television screen simply changes in accordance with a recognition command. In the present exemplary embodiment, a list of recognition commands is further displayed, as illustrated in FIG. 8. FIG. 8 illustrates a list of recognition commands 801 and a focus 802 is placed on a recognition command which is selected by the recognition command selection unit 104.

When a user short presses the speech recognition button, the recognition command execution unit 105 executes a recognition command which is selected by the recognition command selection unit 104, and the screen changes. In addition, the recognition command execution unit 105 displays the list of recognition commands 801. In the list of recognition commands 801, the focus 802 is placed on a recognition command which is selected by the recognition command selection unit 104. The recognition command execution unit 105 deletes the list of recognition commands 801 after displaying the list of recognition commands 801 for a predetermined length of time. When a user consecutively short presses the speech recognition button, the recognition command execution unit 105 sequentially executes recognition commands that are selected by the recognition command selection unit 104. Additionally, the focus 802 is sequentially shifted down the list of recognition commands 801 to the recognition command that is executed by the recognition command execution unit 105. The recognition command execution unit 105 can delete the list of recognition commands 801 after a predetermined length of time elapses from when the user starts short pressing of the speech recognition button.

Seventh Exemplary Embodiment

In the above-described exemplary embodiments, when a user short presses a speech recognition button, the television channel changes in a predetermined order in accordance with the selected recognition command. In order to realize the above exemplary embodiments, the information processing apparatus needs to store a list of recognition commands and the present position of command in the list. For example, the television channel of the television set which is illustrated in FIG. 8 changes in order from the top of the list of commands 801, i.e., in the order of 152, 327, 418 . . . , etc. In such a case, when a user short presses the speech recognition and the television channel changes from 152 to 327, the list of recognition commands 801 and information that the present television channel is the second item on the list, are stored in a memory. Consequently, the television channel can change to 418 when the user short presses the speech recognition button next time.

However, the present invention is not limited to an exemplary embodiment in which the list of recognition commands and the present position on the list are kept stored after the channel changes. For example, the position on the list of recognition commands 801 can be reset after a predetermined length of time R lapses. In such a case, if the user consecutively short presses the speech recognition button at time intervals that are shorter than R, the television channel changes in the predetermined order (i.e., 152, 327, 418) on the list of recognition commands 801. On the other hand, if the television channel remains at channel 418 longer than or equal to time R, the position on the list of recognition commands in the list 801 is initialized, and the television channel changes to 152 when the user short presses the speech recognition button next time.

Eighth Exemplary Embodiment

In the above-described exemplary embodiments, when a user short presses the speech recognition button, the television channel changes in a predetermined order in accordance with the recognition command. In order to realize the above exemplary embodiments, the information processing apparatus needs to store a list of recognition commands and the present position of command in the list.

However, the list of recognition commands 801 in FIG. 8 can be different before and after the recognition commands are executed, depending on the use of the present invention. In such a case, the list of recognition commands can be updated when a predetermined length of time S elapses after the recognition commands are executed.

Figure 9:
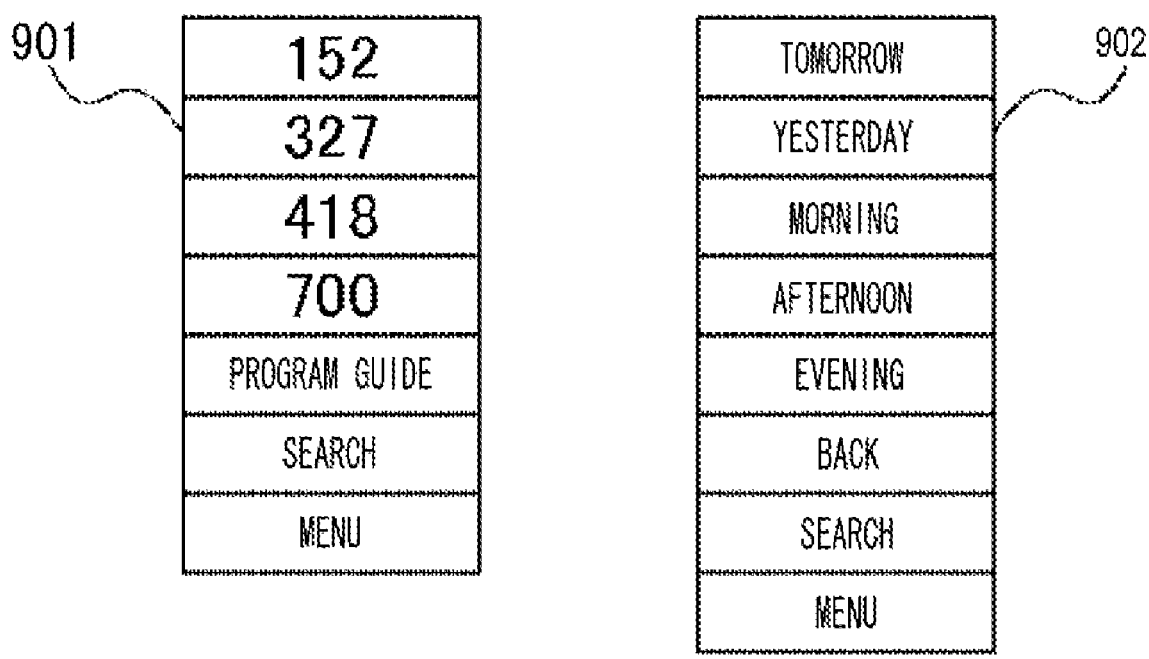
FIG. 9 illustrates a list of recognition commands according to an eighth exemplary embodiment of the present invention.

Operation according to the present exemplary embodiment will be described below by referring to FIG. 9. FIG. 9 illustrates an example of a list of recognition commands 901 which is displayed on the program viewing screen of the television set 301 according to the present exemplary embodiment. Additionally, an example of a list of recognition commands 902 is displayed on the program guide screen of the television set 301. The recognition command list 901 on the program viewing screen changes every time a user short presses the speech recognition button.

It is assumed that the program viewing screen is changed to "program guide" on the list of recognition commands 901, and a user short presses the speech recognition button within a predetermined length of time S after changing to the present screen. In this case, the program viewing screen changes to "search" which follows "program guide", while the list of recognition commands 901 is retained. On the other hand, when a predetermined time S elapses after changing to "program guide", the display changes to the list of recognition commands 902 on the program guide screen. If the user then short presses the speech recognition button, "tomorrow" at the top of the list of recognition commands 902 on the program guide screen is selected as the recognition command, and the selected recognition command is executed.

Ninth Exemplary Embodiment

In the above exemplary embodiments, the recognition command selection unit 104 selects in a predetermined order a recognition command from all of the recognition commands. However, the present invention is not limited to the above exemplary embodiments and can also be applied to a case where the recognition command selection unit 104 selects a recognition command only from a predetermined subset among recognition commands that are recognition targets. Such a case is illustrated in FIG. 10.

Figure 10:
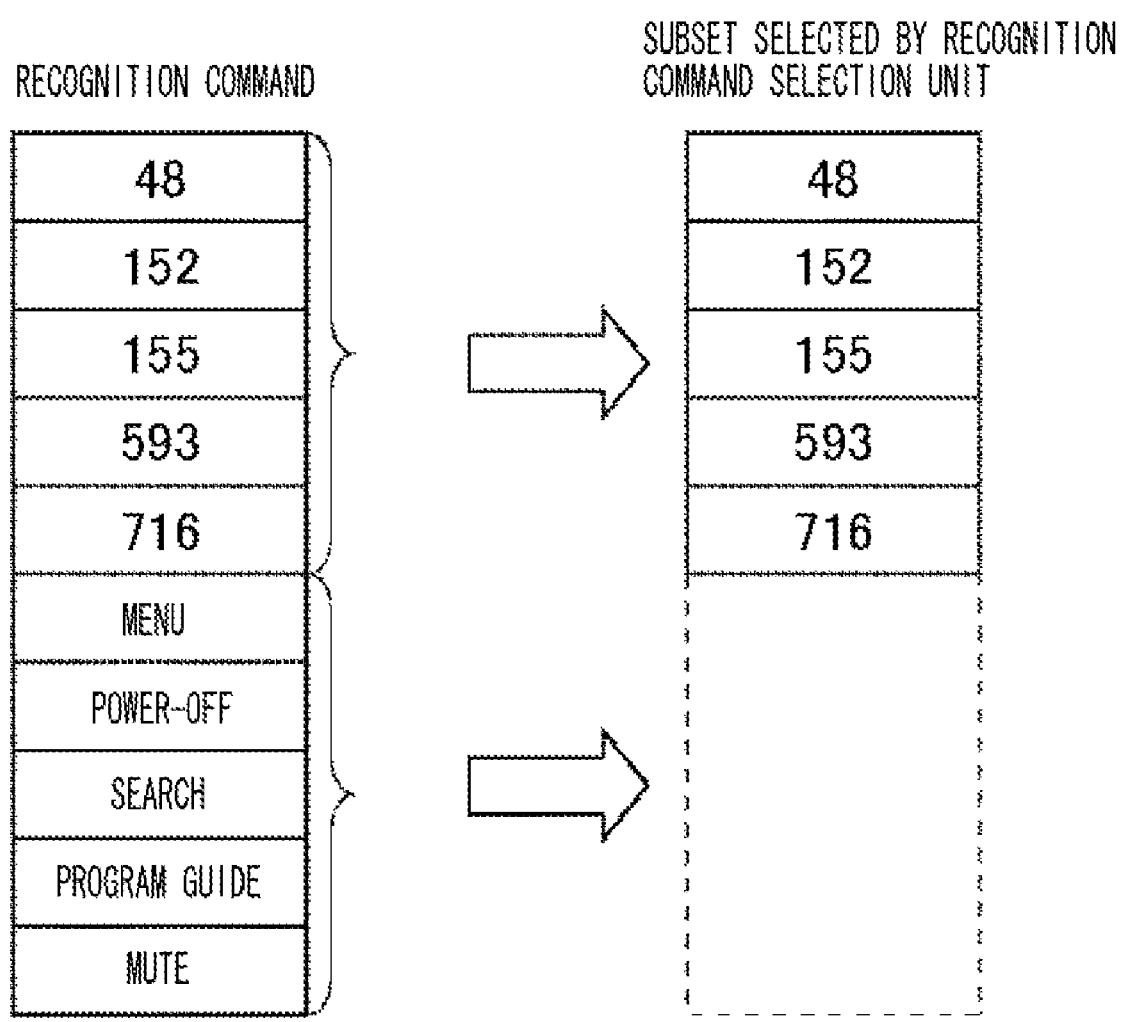
FIG. 10 illustrates a subset of recognition commands according to a ninth exemplary embodiment of the present invention.
Figure 12:
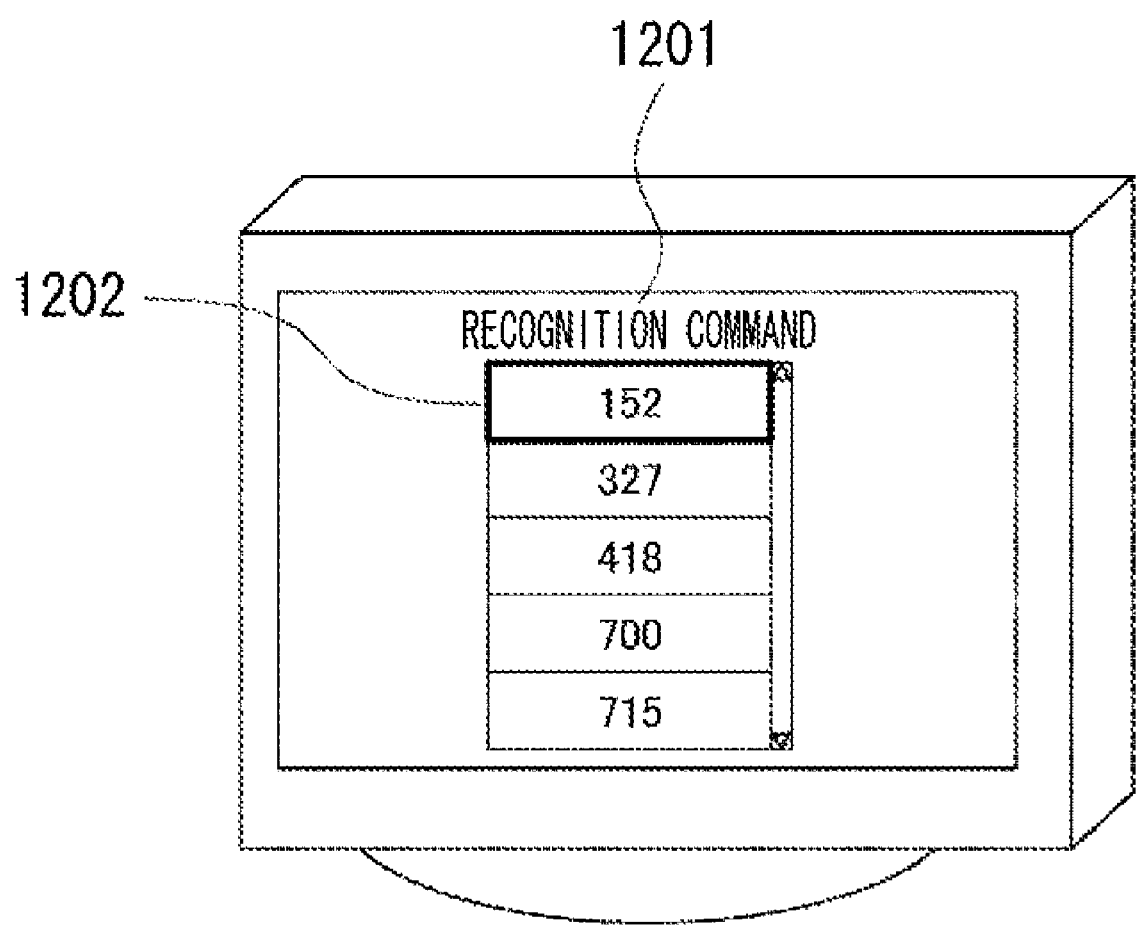
FIG. 12 illustrates a list of recognition commands displayed according to a conventional method.

Recognition commands that are illustrated in FIG. 10 include change of television channels, as well as menu, and power-off. However, a subset of recognition commands from which the recognition command selection unit 104 selects a recognition command is limited to television channel selection. Therefore, if a user consecutively short presses a speech recognition button, only the channel is changed. A type of the subset can be freely determined. As described above, according to the present exemplary embodiment, the recognition command selection unit 104 can select a recognition command only from the subset of recognition commands that is determined in accordance with a given criterion.

Tenth Exemplary Embodiment

In the above-described exemplary embodiments, the recognition command selection unit 104 can select a recognition command in any order. In FIG. 3, the recognition command selection unit 104 consecutively selects recognition commands in a numerical order (or an alphabetical order). In the present exemplary embodiment, the recognition command selection unit 104 selects recognition commands in the order of difficulty level of speech recognition.

Recognition commands show a different difficulty level of speech recognition in accordance with speech content. FIG. 11 illustrates recognition commands and corresponding phoneme sequences for pronouncing the recognition commands. In FIG. 11, recognition commands "152" and "155" have 10 common phonemes in 12 phonemes. Therefore, the recognition commands can be misrecognized easily, and the difficulty level of speech recognition is high.

There are various conventional methods for calculating the difficulty level of speech recognition, and any methods can be used in the present exemplary embodiment. For example, the difficulty level of speech recognition can be calculated based on a proportion of phonemes in a recognition command that match with another recognition command. Additionally, calculation can be based on phoneme feature, degree of similarity between phonemes, or phoneme numbers. Moreover, each recognition command can include a previously calculated value about the difficulty level of speech recognition. Furthermore, the difficulty level of speech recognition can be calculated when the speech recognition unit 103 reads the list of recognition commands. The recognition command selection unit 104 selects recognition commands in the descending order of the difficulty level of speech recognition which is obtained by any of the above-described methods.

As described above, by arranging recognition commands in the descending order of the difficulty level of speech recognition, recognition commands that can be easily misrecognized are arranged at the beginning of the list. On the other hand, recognition commands that are not easily misrecognized are arranged at the end of the list. That is, recognition commands that are difficult to be recognized by speech recognition can be easily selected in a sequential selection. Moreover, recognition commands that require an increasing number of operations in sequential selection can be easily recognized by speech recognition. Therefore, the information processing apparatus of the present invention realizes an operation in which the two methods of selecting a recognition command can complement each other.

Eleventh Exemplary Embodiment

In the above-described exemplary embodiments, as illustrated in FIG. 1, the process determination unit 102 selects either the speech recognition unit 103 or the recognition command selection unit 104 based on the pressing time of the speech recognition button. However, the present invention is not limited to the pressing time, and a different operation performed on an operation unit (such as a lever or a touch sensor) can be used to switch between the speech recognition unit 103 and the recognition command unit 104. In such a case, the pressing time obtaining unit 101 is not necessary. For example, if a lever is pushed forward, the process determination unit 102 selects the speech recognition unit 103, and if the lever is pulled backward, the process determination unit 102 selects the recognition command selection unit 104. The present invention can also be applied to such an embodiment.

Other Exemplary Embodiments

The present invention can also be achieved by providing a storage medium, which stores software (program code) for realizing the operations of the above-described exemplary embodiments, to a system or an apparatus. The program code stored in the storage medium can be read and executed by a computer (central processing unit (CPU) or micro-processing unit (MPU)) of the system or the apparatus.

In this case, the software (program code) itself realizes the operations of the embodiments. The software (program code) itself and the storage medium, which stores the software (program code), constitute the present invention. The storage medium can be, for example, a Floppy® disk, a hard disk, an optical disk, a magneto-optical disk, a compact disc-read-only memory (CD-ROM), a CD-recordable (CD-R), a CD-rewritable (CD-RW), a digital versatile disc (DVD), a DVD-ROM, a magnetic tape, a nonvolatile memory card, or a ROM.

Furthermore, the above-described exemplary embodiments can be not only realized by executing program code read by a CPU. An operating system (OS) or the like working on a computer can also perform a part or the whole of processes according to instructions of the program code and realize functions of the above-described exemplary embodiments.

Furthermore, program code read from a storage medium can be stored in a memory equipped in a function expansion board inserted in a computer or a function expansion unit connected to a computer, and a CPU in the function expansion board or the function expansion unit can execute all or part of the processing based on the instructions of the program code to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-332174 filed Dec. 8, 2006, which is hereby incorporated by reference herein in its entirety.

What is claimed is:

1. An information processing apparatus which executes a process in accordance with a command, comprising:
a first selection unit configured to refer to a storage unit that stores a plurality of recognition commands for inputting the command by speech, recognize input speech, and select a command;
a second selection unit configured to sequentially select a plurality of commands that correspond to a plurality of recognition commands stored in the storage unit;
a process determination unit configured to select either the first selection unit or the second selection unit based on an operation performed on a predetermined button; and
an execution unit configured to execute a command which is selected by one of the selection units that is selected by the process determination unit,
wherein the process determination unit selects either the first selection unit or the second selection unit, based on a pressing time representing a length of time the button is pressed,
wherein the process determination unit selects the first selection unit if the pressing time is shorter than a defined time duration, and selects the second selection unit if the pressing time is longer than or equal to the defined time duration, and
wherein the execution unit sequentially executes the command at a predetermined time interval if the second selection unit is selected.

2. An information processing apparatus which executes a process in accordance with a command, comprising:
a first selection unit configured to refer to a storage unit that stores a plurality of recognition commands for inputting the command by speech, recognize input speech, and select a command;
a second selection unit configured to sequentially select a plurality of commands that correspond to a plurality of recognition commands stored in the storage unit;
a process determination unit configured to select either the first selection unit or the second selection unit based on an operation performed on a predetermined operation unit;
an execution unit configured to execute a command which is selected by one of the selection units that is selected by the process determination unit; and
a difficulty level of speech recognition obtaining unit configured to obtain the difficulty level of speech recognition for each of the recognition command,
wherein the second selection unit sequentially selects a plurality of commands corresponding to a plurality of recognition commands stored in the storage unit, in descending order of the difficulty level of speech recognition of the corresponding recognition commands.

3. A method for executing a process in accordance with a command, the method comprising:
selecting either a first selecting process for selecting a command by referring to a storage unit that stores a plurality of recognition commands for inputting the command by speech, and recognizing input speech, or a second selecting process for sequentially selecting a plurality of commands that correspond to a plurality of recognition commands stored in the storage unit, based on operation performed on a predetermined button; and
executing a command which is selected by one of the selecting processes that is selected by the selecting step,
wherein either the first selecting process or the second selecting process is selected based on a pressing time representing a length of time the button is pressed,
wherein the first selecting process is selected if the pressing time is shorter than a defined time duration, and the second selecting process is selected if the pressing time is longer than or equal to the defined time duration, and
wherein the command is sequentially executed at a predetermined time interval if the second selecting process is selected.

4. A method for executing a process in accordance with a command, the method comprising:
selecting either a first selecting process for selecting a command by referring to a storage unit that stores a plurality of recognition commands for inputting the command by speech, and recognizing input speech, or a second selecting process for sequentially selecting a plurality of commands that correspond to a plurality of recognition commands stored in the storage unit, based on operation performed on a predetermined operation unit;
executing a command which is selected by one of the selecting processes that is selected by the selecting step; and
obtaining a difficulty level of speech recognition for each of the recognition command,
wherein the second selecting process sequentially selects a plurality of commands corresponding to a plurality of recognition commands stored in the storage unit, in descending order of the difficulty level of speech recognition of the corresponding recognition commands.

* * * * *